United States Patent
Zambri et al.

(10) Patent No.: US 8,254,063 B2
(45) Date of Patent: Aug. 28, 2012

(54) SLIDER FOR A HEAD GIMBAL ASSEMBLY WITH AN INVERTED DIMPLE

(75) Inventors: Razman Zambri, Eden Prairie, MN (US); Michael Allen Greminger, St. Anthony, MN (US); Dadi Setiadi, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 34 days.

(21) Appl. No.: 12/910,077

(22) Filed: Oct. 22, 2010

(65) Prior Publication Data

US 2012/0099224 A1   Apr. 26, 2012

(51) Int. Cl.
   *G11B 5/56* (2006.01)
(52) U.S. Cl. .................................................. 360/245.1
(58) Field of Classification Search ................. 360/245.1
   See application file for complete search history.

(56) References Cited

U.S. PATENT DOCUMENTS

| | | | |
|---|---|---|---|
| 5,636,089 A | 6/1997 | Jurgenson et al. | |
| 5,661,619 A | 8/1997 | Goss | |
| 5,729,889 A | 3/1998 | Goss | |
| 5,920,444 A | 7/1999 | Heeren et al. | |
| 6,011,671 A | 1/2000 | Masse et al. | |
| 6,376,964 B1 * | 4/2002 | Young et al. | 310/311 |
| 6,710,978 B2 | 3/2004 | Holaway et al. | |
| 6,738,225 B1 | 5/2004 | Summers et al. | |
| 7,268,942 B2 | 9/2007 | Kuo | |

* cited by examiner

*Primary Examiner* — Mark Blouin
(74) *Attorney, Agent, or Firm* — Hall Estill Attorneys at Law

(57) ABSTRACT

Apparatus and method for forming a head gimbal assembly (HGA). In accordance with various embodiments, a slider is formed with opposing first and second side surfaces, an air bearing feature on said first side surface and a dimple extending from said second side surface adapted to facilitate multi-axial rotation of the slider.

20 Claims, 5 Drawing Sheets

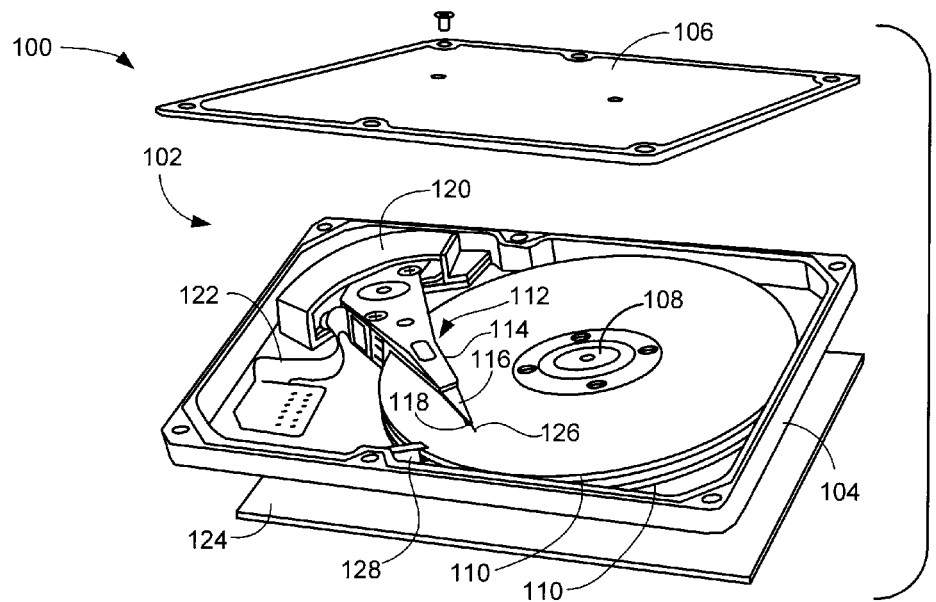
FIG. 1
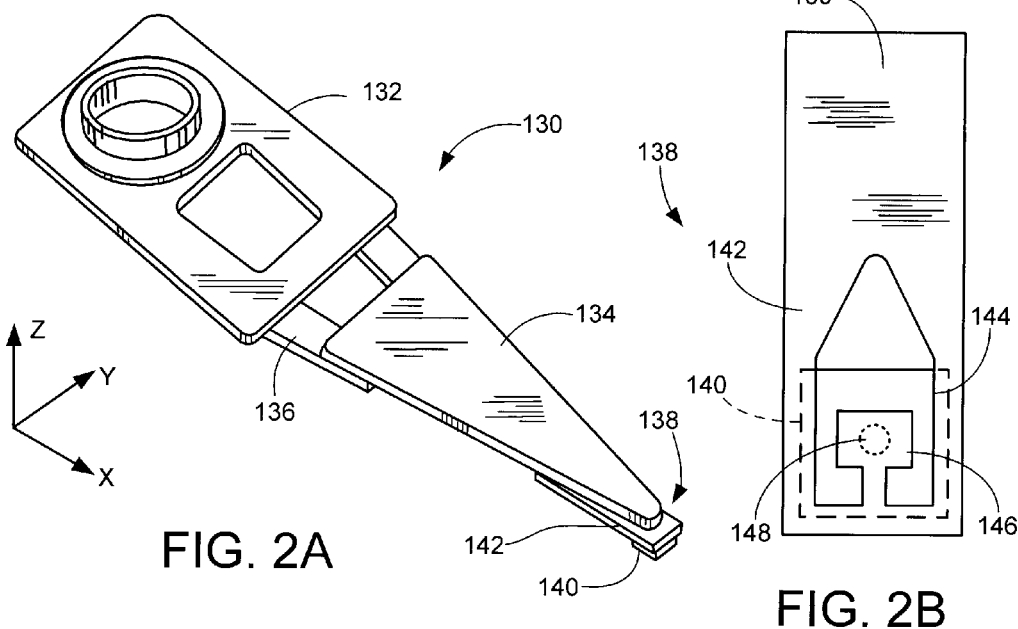
FIG. 2A
FIG. 2B

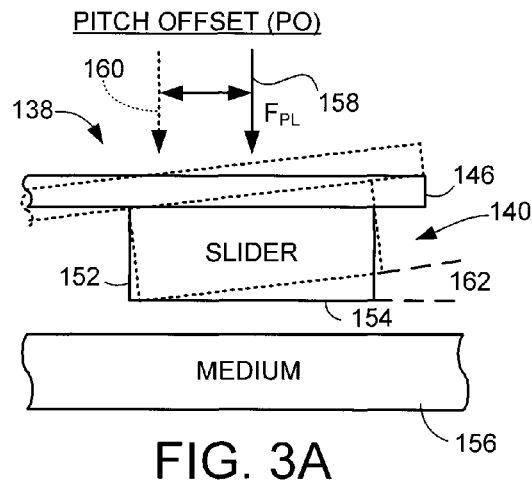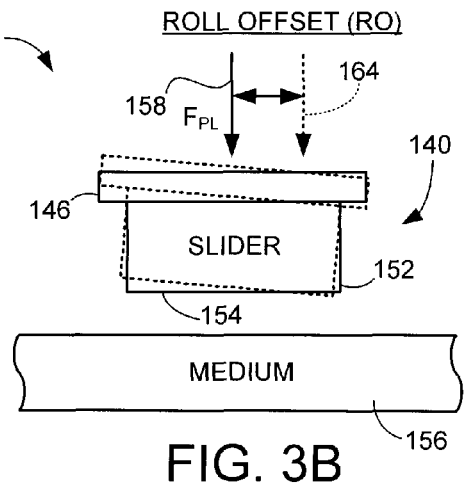
FIG. 3A    FIG. 3B
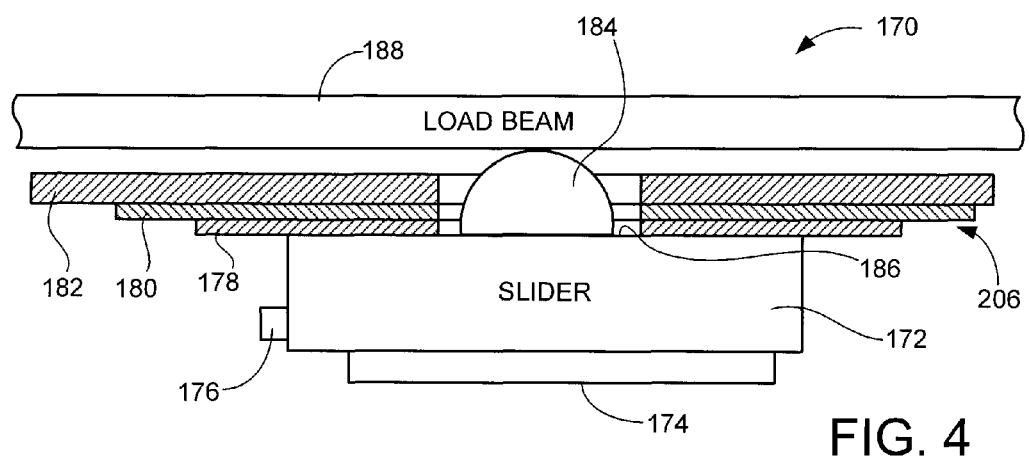
FIG. 4
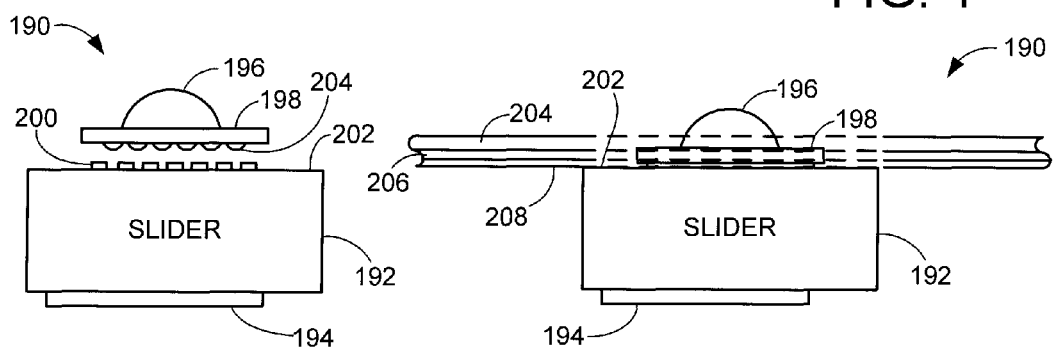
FIG. 5A    FIG. 5B

SLIDER FOR A HEAD GIMBAL ASSEMBLY WITH AN INVERTED DIMPLE

SUMMARY

Various embodiments of the present invention are generally directed to an improved head gimbal assembly (HGA), and methods for making the same.

In accordance with exemplary embodiments, the HGA includes a slider with opposing first and second side surfaces, an air bearing feature on said first side surface and a dimple extending from said second side surface adapted to facilitate multi-axial rotation of the slider.

These and other features and aspects which characterize various embodiments of the present invention can be understood in view of the following detailed discussion and the accompanying drawings.

BRIEF DESCRIPTION OF THE DRAWINGS

FIG. 1 provides an exploded view of an exemplary data storage device.

FIG. 2A depicts an exemplary suspension assembly.

FIG. 2B shows a gimbal plate of the suspension assembly of FIG. 2A.

FIGS. 3A and 3B illustrate pitch and roll offsets that may result from slider/dimple misregistration.

FIG. 4 illustrates an exemplary construction of a head gimbal assembly (HGA) in accordance with various embodiments of the present invention.

FIGS. 5A-5C show various aspects of another exemplary HGA in accordance with various embodiments.

DETAILED DESCRIPTION

Figure 5C:
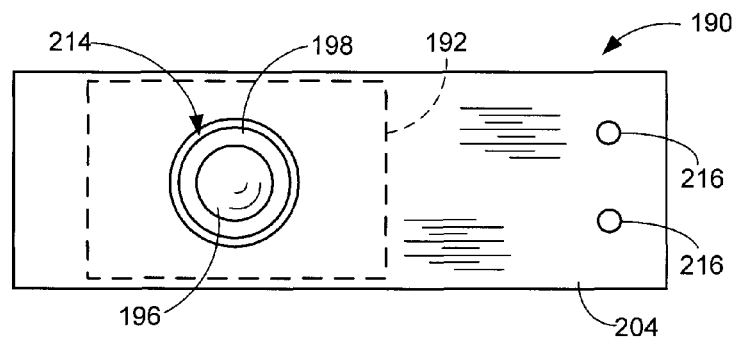

The present disclosure is generally directed to an improved head gimbal assembly (HGA) configuration suitable for use in a data storage device.

HGAs are often used to support data transducers adjacent rotating media surfaces to facilitate data read and write operations. An exemplary HGA can include discrete write and read transducing elements mounted to a slider. The slider is provisioned with an air bearing surface such as an advanced air bearing, or AAB. The AAB enables the slider to be hydrodynamically supported adjacent an associated rotating surface by fluidic currents (e.g., air, helium, etc.) established by high speed rotation of the surface. The combination of slider and transducing elements is sometimes referred to as a head.

The head may be mechanically coupled to a gimbal. A hemispherically (dome) shaped dimple allows the slider to pivot along multiple axes to follow the topography of the media surface. These axes may include a pitch axis (nose up or down rotation) and a roll axis (side-to-side rotation).

The gimbal is often supported at a distal end of a flexible suspension (flexure), which in turn may project from a rotatable actuator arm of an actuator assembly. In this way, the actuator can be controllably rotated to place the transducing elements in a data read/write relation to an associated track, and the slider can pitch and roll about the gimbal as required to maintain the slider in a stable flying relationship over said track.

In at least some HGA configurations, the flight characteristics of a slider can be dominated by three main loads that are applied to the slider by the gimbal. These loads can be characterized as preload (PL), pitch torque (PT) and roll torque (RT). PL generally constitutes the force applied through the centroid of the slider by the gimbal. PT is generally established by the pitch static attitude (PSA) and the gimbal pitch stiffness. RT is generally established by roll static attitude (RSA) and the gimbal roll stiffness.

Real world manufacturing environments can introduce variability in the dimple position relative to the slider. This variability can arise as a result of the gimbal forming and attachment process, the slider fabrication and assembly processes, and the interconnection circuit assembly process. These variations can be expressed along three orthogonal dimensions, and the accumulated variations can result in significant pitch and/or roll offset errors in the flight characteristics of the slider. It is contemplated that greater levels of sensitivity to dimple placement errors will be experienced as future generations of HGAs are provided with reduced size and fly height characteristics.

Accordingly, various embodiments of the present invention are directed to an improved HGA configuration that provides improved control in the relative placement of the dimple and the slider. These embodiments can be understood beginning with a review of FIG. 1, which provides an exploded representation of an exemplary data storage device 100. The device 100 includes a housing 102 formed from a base deck 104 and top cover 106. A fluidic atmosphere is retained within the housing, such as an air atmosphere or a low density, inert gas atmosphere (e.g., helium).

A spindle motor 108 is configured to rotate a number of storage media (e.g., magnetic discs) 110 at a selected high rotational velocity. An actuator assembly 112 includes rigid actuator arms 114 which support a corresponding array of flexible suspension assemblies (flexures) 116. At the end of each flexure 116 is a head gimbal assembly (HGA) 118. Each HGA includes a slider that forms an air bearing to allow the HGA to fly at a desired fly height above the associated surface. For reference, the term "air bearing" is used herein even if the surrounding atmospheric fluid is a non-air atmosphere, such as helium. Read and write transducing elements are arranged on the slider to facilitate read and write operations with data tracks defined on the media surfaces.

The actuator 112 is rotated by a voice coil motor (VCM) 120. Electrically conductive signal paths are formed on a flexible printed circuit cable (flex circuit) 122 which couples the actuator 114 with a device printed circuit board (PCB) 124. The device PCB is mounted to an external surface of the base deck 104 and supports communication and control circuitry used by the device to interface with a host. In some embodiments, a ramp load tab 126 may project forward adjacent each HGA 118 to allow the HGAs to be unloaded from the media surfaces onto a ramp structure 128 when the device 100 is deactivated.

FIG. 2A is an isometric view of an exemplary suspension assembly 130. A base 132 supports a load beam 134 by way of a preload bend section 136. An HGA 138 is supported at a distal end of the load beam 134 and includes a transducer (head) 140 and a gimbal plate 142. A top plan representation of the gimbal plate 142 is shown in FIG. 2B.

The gimbal plate includes a cutout aperture 144 that defines a support tab 146. The slider is secured to the underlying surface of the tab 146. A hemispherically shaped dimple 148 imparts a force upon an upper surface of the tab 146.

A base attachment portion 150 of the gimbal plate 142 is secured to the underlying surface of the load beam using a suitable adhesive (not shown). This provides a spring force that assists in establishing the gimbal load force. The ball-contact provided by the dimple 148 allows articulation of the head 140 along a pitch axis (x-direction) and a roll axis (y-direction). It will be appreciated that the various component shapes, orientations, relative dimensions and aspect ratios illustrated in the drawings are merely exemplary and can vary as desired. Electrical interconnections to the transducing elements of the head 140 can be provided by a flex circuit (not shown) which is routed along the gimbal plate to the slider.

FIGS. 3A and 3B illustrate how errors in the relative placement of the dimple 148 relative to the head 140 can affect flight characteristics of the HGA 138. Pitch offset (PO) errors are illustrated in FIG. 3A, and roll offset (RO) errors are shown in FIG. 3B. It will be appreciated that the errors can extend in directions opposite those shown in the figures.

In FIG. 3A, a slider 152 of the head 140 is coupled to the tab 146 (FIG. 2B). The slider 152 includes an air bearing (AAB) surface 154 to support the slider above a medium 156 at a desired fly height.

A preload force $F_{PL}$ from the dimple is represented by vector 158 and is applied at a nominally ideal central location. This location may be selected to cause the slider 154 to nominally fly with no pitch angle relative to the medium, such as by passing through the centroid (center of mass) of the slider 152. The applied gimbal force location may alternatively be selected to impart a small amount of positive or negative pitch to the slider. For example, some HGA designs impart a small amount of negative pitch (nose up attitude) so that the read/write transducing elements on the trailing edge of the slider are brought closer to the media surface. This attitude can also help with mitigation of contaminating particles on the media surface.

Due to manufacturing variations during the fabrication of the HGA 138, it is contemplated that the actual location at which the preload force $F_{PL}$ is applied may be offset along the x-direction, such as exemplified by vector 160. This offset may tend to introduce an undesired pitch angle 162 upon the slider 152 as illustrated in FIG. 3A. Similarly, FIG. 3B shows the effects of an offset in the preload force $F_{PL}$ along the y-direction by vector 164, resulting in an undesired induced roll angle for the slider 152.

Accordingly, various embodiments provide an improved HGA construction that reduces the effects of such dimple/slider misalignments. As explained below, the various HGA constructions precisely locate the dimple directly on an upper surface of the slider.

FIG. 4 shows an exemplary HGA 170 constructed in accordance with some embodiments. The HGA 170 includes a slider 172 with air bearing (AAB) features along a lower surface 174. A data transducing element 176, such as a read or write element, is supported along a trailing edge (TE) of the slider 172. A flex circuit provides electrical interconnections for use by the data transducing element 176 and includes an electrically conductive layer (e.g., copper traces) 178 formed on an electrically insulative polyimide layer 180. A stainless steel gimbal plate is shown at 182.

A hemispherically (dome) shaped dimple 184 is connected to an upper surface 186 of the slider 172 opposite the air bearing surface 174. In some embodiments, the dimple 184 is formed from a suitable hard material such as liquid crystal polymer (LCP) using a suitable manufacturing process such as injection molding, photo lithography, micro-imprinting, etc. The dimple 184 may be formed directly on, or separately fabricated and affixed to, the upper slider surface 186. That is, the dimple 184 may be in direct contact with the upper slider surface 186, or may have a connection interface disposed between the dimple 186 and slider surface 186.

Apertures can be formed in the respective flex circuit and gimbal plate layers 178, 180 and 182 to accommodate the dimple 184. Once in place, the dimple 184 is brought into contacting engagement with an underlying surface of a load beam 188 to allow multi-axial rotation of the slider 172. It will be noted that manufacturing variations in the location of the dimple 184 relative to the air bearing surface 174 are substantially limited to a single factor, namely, the ability to precisely place the dimple 184 onto the top surface 186 of the slider 182 at the desired location thereon.

FIGS. 5A-5D illustrate another HGA 190 constructed in accordance with various embodiments of the present invention. The HGA 190 utilizes a slider 192 with air bearing features along lower surface 194. A dimple 196 is formed on a thin-film support ring 198. As before, the dimple 196 may be formed of LCP or other suitable material. The support ring 198 may be formed of polyimide or other suitable material.

A first alignment feature 200 is provided on a top surface 202 of the slider opposite the air bearing surface 194. The first alignment feature can take any number of forms, such as a series of spaced apart pads as shown. These pads may be formed using a variety of processes such as printing or etching. The underside of the support ring 198 can be provisioned with a second alignment feature 204 such as a series of detents that interlock with the pads 200. The detents can also be formed using a suitable process such as printing or etching. The first and second alignment features 200, 204 are configured to provide self-alignment to ensure correct placement of the dimple 196 onto the slider 192. As desired, adhesive or some other affixing mechanism can be used to affix the dimple to the slider.

Once the dimple 196 has been affixed to the slider 192, the slider can be attached to various components, such as a flex circuit 206 with copper and polyimide layers 208, 210, and a gimbal plate 212, as shown in FIG. 5B. As before, a common aligned aperture 214 can be provided in these layers to surround and accommodate the dimple 196, as shown by the top plan view of FIG. 5C.

In this way, the dimple 196 will extend from the slider to a plane above the gimbal 212 to a load plate. While a gimbal tab such as 146 in FIG. 2B can be used, it will be appreciated from FIG. 5C that such is not necessarily required. Rather, the gimbal plate 212 can be a substantially planar, rectilinear solid bar (apart from the dimple aperture 214). Alignment apertures 216 can extend through an attachment end 218 of the gimbal as desired to facilitate attachment to the load beam.

In alternative embodiments, portions of the top surface 202 of the slider 192 can be etched or otherwise removed using a suitable material removal process such as laser abrasion to integrally form the dimple 196 from the same material that makes up the slider 192.

Figure 6A:
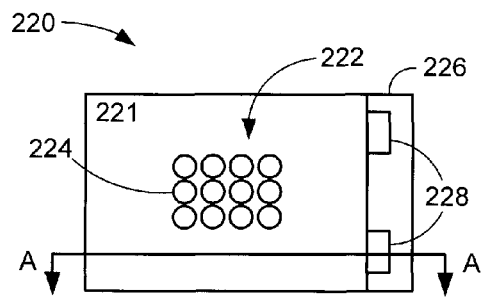
FIGS. 6A-6D show a manufacturing sequence for another exemplary HGA formed in accordance with various embodiments.

FIGS. 6A-6D provide various schematic views of an exemplary portion of an HGA 220 in accordance with further embodiments of the present invention. In FIG. 6A, a slider 221 has an alignment region 222 with a plurality of spaced apart protrusions 224 arranged about a predetermined location on the slider. It some embodiments, the protrusions 224 are formed by removing portions of the top surface of the slider with grooves or notches.

The slider 221 further is configured with a formation feature 226 that has a plurality of spaced apart aligning plates 228. The formation feature 226 and aligning plates 228 can be constructed or assembled on the slider 221 in order to properly form the alignment region 222 about the predetermined location on the slider 221. In exemplary embodiments, the aligning plates 228 provide boundaries to which the alignment feature 222 lies within.

Figure 6B:
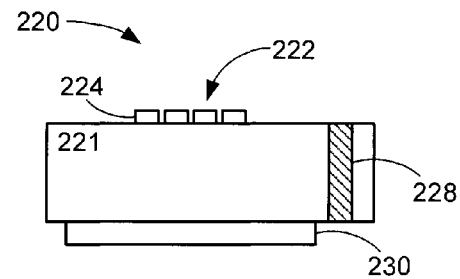

FIG. 6B provides a side view of the slider 221 along cross section A-A of FIG. 6A. The slider has the alignment feature 222 and protrusions 224 on a first side surface and an air bearing feature 230 on an opposite second side surface. As before, the air bearing feature 230 is configured to continuously face a data storage medium to provide hydrodynamic support for the slider. As shown, the aligning plates 228 continue throughout the height of the slider 220 to provide alignment parameters for both top and bottom side surfaces.

Figure 6C:
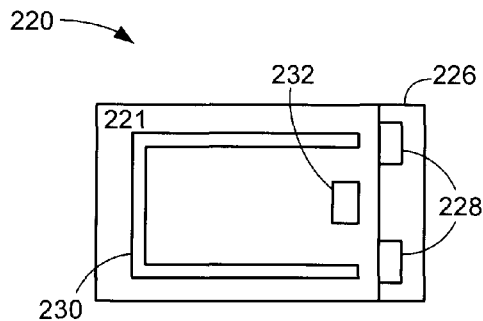

A bottom view of the slider 221 is provided in FIG. 6C and illustrates an exemplary air bearing feature 230 corresponding to the aligning plates 228. Various embodiments of the present invention include an air bearing protrusion 232 that can further be formed or assembled on the slider 220 with the alignment aid of the aligning plates 228. It should be noted that the various shapes, sizes, and orientations of the aligning plates 228 are not limited and can be modified, as desired. However, by having the aligning plates 228 extend through the height of the slider 221, a single construction element can align features on opposing sides of the slider and reduce manufacturing time while increasing manufacturing consistency.

Figure 6D:
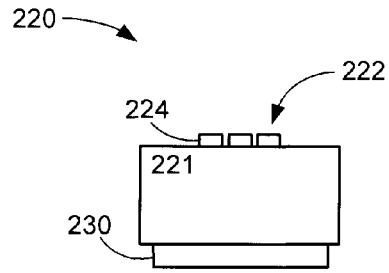

FIG. 6D shows a front view of the slider 221 with alignment feature 222 and protrusions 224 adapted to engage a dimple and an air bearing feature 230 adapted to provide desired flight above a storage medium during operation. While the various features of slider 221 can be formed or assembled in any order, in some embodiments, the slider and aligning plates are constructed with the slider before the air bearing feature 230 and alignment feature 222 are formed.

Figure 7A:
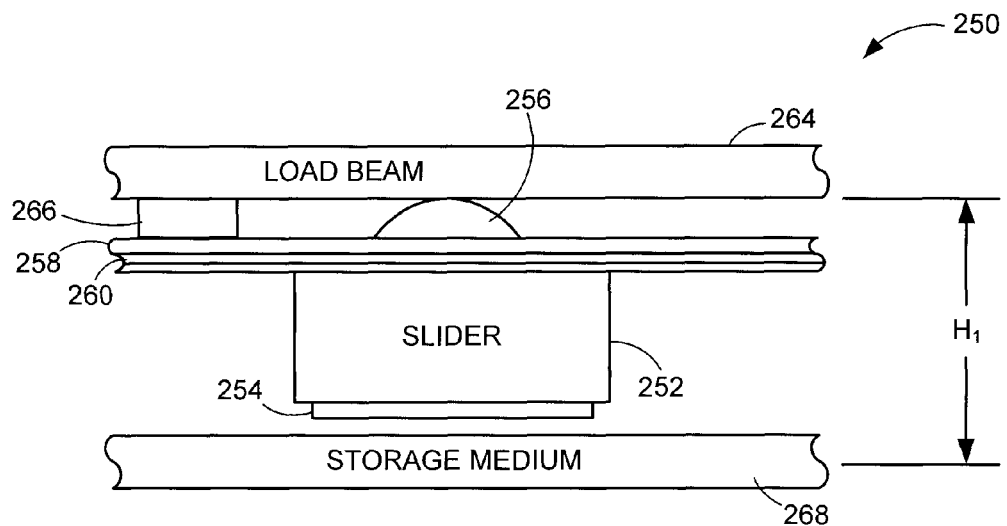
FIGS. 7A and 7B show different load beam configurations suitable for use with an HGA formed in accordance with various embodiments.

FIG. 7A shows another exemplary HGA 250 in accordance with various embodiments of the present invention. FIG. 7A illustrates a slider 252 with an air bearing feature 254 on a first side and a dimple 256 on a second side opposite the first side. The slider 252 is attached to a gimbal 258 and a flex circuit 260. The gimbal 258 is attached to a load beam 264 using an alignment block 266. The alignment block 266 is inserted between, and respectively attached to, the gimbal 258 and the load beam 264 using adhesive or another suitable attachment mechanism.

The point at which the curvilinear portion of the dimple 256 contacts the load beam 264 (roll center) is at a distance $H_1$ from the media surface. Thus, while the configuration of FIG. 7A provides enhanced operational characteristics, the separation distance $H_1$ may subject the slider to an unacceptable amount of roll and pitch error disturbances in response to operational shock and resonance vibrations.

Figure 7B:
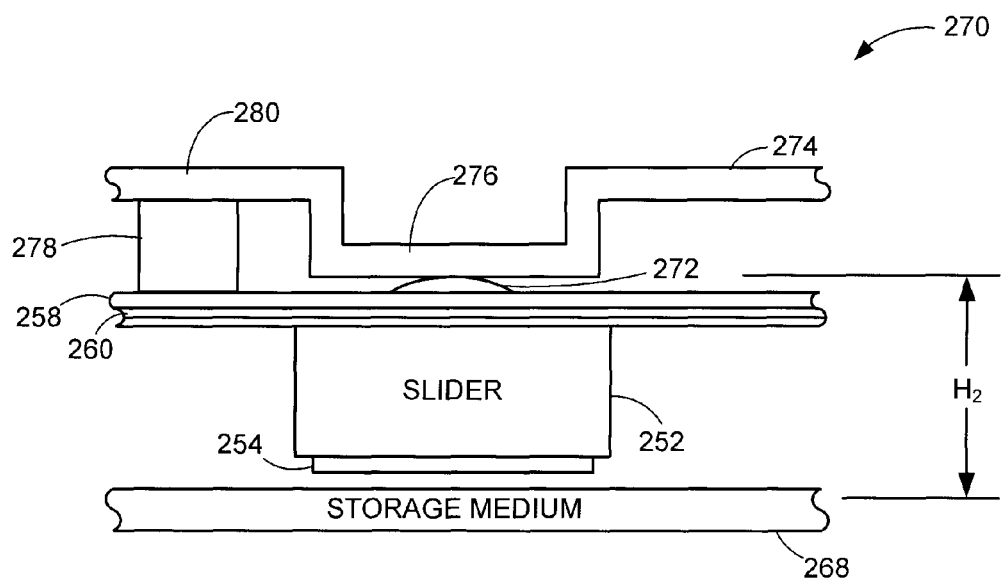

FIG. 7B provides another exemplary HGA 270 nominally identical to the HGA 250 except that a shorter dimple 272 is used having a greater radius of curvature than the dimple 256 in FIG. 7A. In addition, a stepped load beam 274 is provided with a localized lowered portion 276 against which the shorter dimple 272 contactingly abuts. A taller alignment block 278 secures the gimbal 258 to a raised portion 280 of the load beam 274. This configuration provides a lower roll center distance $H_2$, resulting in improved resistance to operational shock and resonance vibrations.

Figure 8:
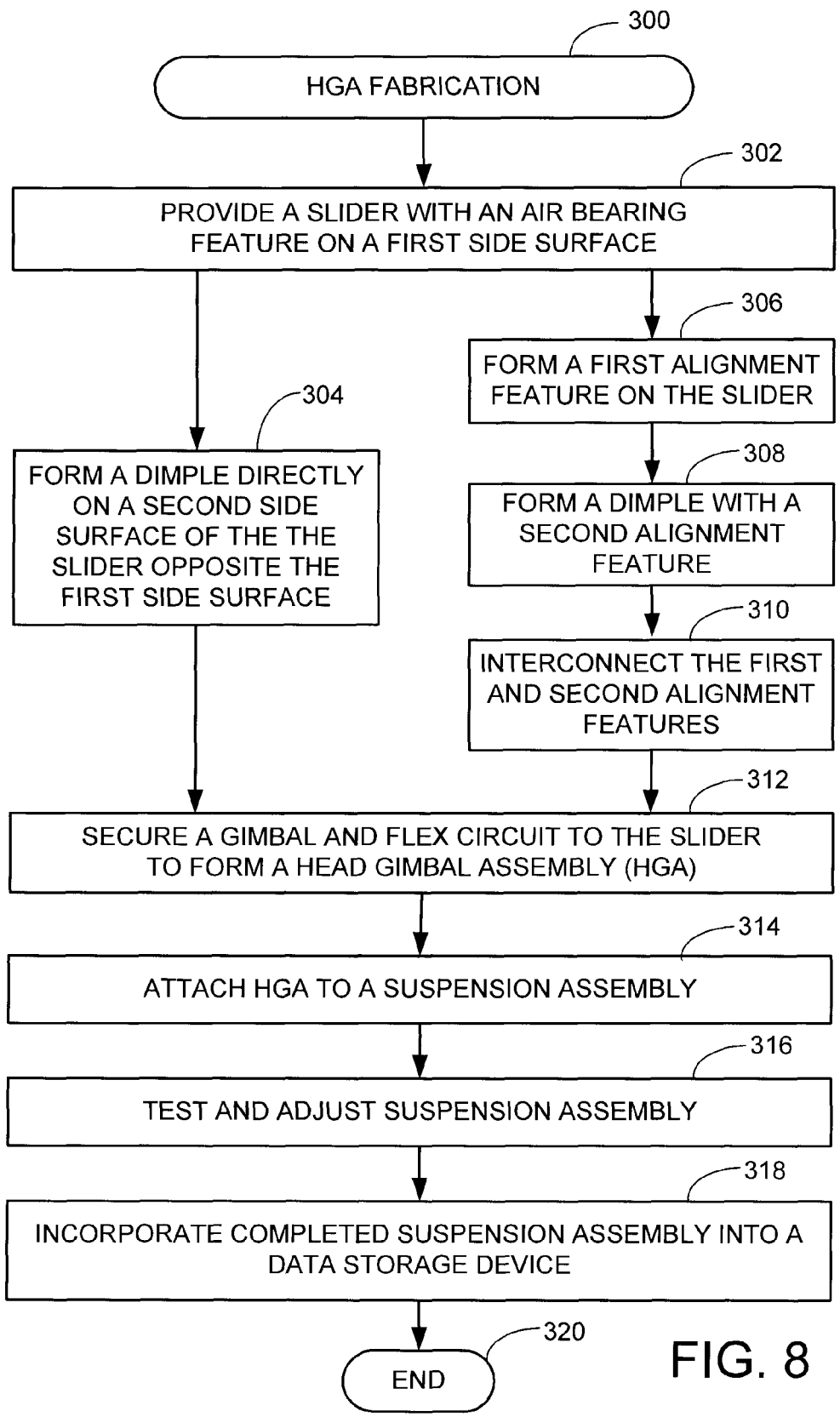
FIG. 8 provides an HGA FABRICATION routine illustrative of steps carried out in accordance with various embodiments of the present invention.

FIG. 8 provides a flow chart for an HGA FABRICATION routine 300 carried out in accordance with the various embodiments discussed above. Initially, a slider with an air bearing feature on a first side surface is provided at step 302. The air bearing feature may be formed by etching the slider block to remove material therefrom, or by attaching various elements to the slider block. Alignment plates may be formed on the side of the slider having the air bearing feature as desired during this step. Other features may be formed on the slider during this step as well, including read/write transducing elements, signal paths, electrically conductive pads, and so on.

A dimple is next formed onto an opposing second side surface of the slider. This may be carried out in a variety of ways as discussed above.

For example, as illustrated by step 304, the dimple may be formed directly onto the slider body. In some embodiments, this is carried out by depositing material such as liquid crystal polymer (LCP) directly onto the second surface at the desired location, and the material is allowed to cure to provide the final desired shape. In other embodiments, etching or some other suitable material removal process is applied to the slider body to remove material to provide the dimple and slider as a single piece unitary piece from a common base material. While the dimple may be formed with a hemispherical shape, such is not necessarily required.

Alternatively, the dimple may be formed separately and then attached to the slider body. For example, as illustrated by step 306, a first alignment feature can be formed on the second side surface. This alignment feature may comprise a plurality of protrusions or recesses that are located in a desired relation to the centroid of the slider body.

A dimple is next formed at step 308. This may be carried out by molding LCP or other suitable material, or by applying a suitable etching or lithography process. As desired, the dimple can incorporate a support ring such as the polyimide ring discussed above. The dimple formed during step 308 may include a second alignment feature configured to self-align with the first alignment feature of step 306. It will be appreciated, however, that such alignment features are not necessarily required.

The first and second alignment features are next interconnected at step 310 to attach the dimple to the slider. This may be carried out using adhesive or some other suitable mechanical attachment process.

Once the dimple is attached to the slider, a gimbal and a flex circuit can be added to the slider at step 312 to form a head gimbal assembly (HGA). As desired, the gimbal and flex circuit are configured with apertures adapted to house the dimple and engage the slider. The flex circuit may be configured with a number of independent conductive traces that correspond to circuits that can be electrically connected to the slider. The connection of the flex circuit to the slider during step 312 may include establishing electrical interconnections between these various elements.

After the gimbal and flex circuit are assembled onto the slider to form the HGA, the HGA is attached to a load beam of a suspension assembly at step 314. Testing and adjustments are made to the assembled suspension assembly at step 316, after which the completed suspension assembly is incorporated into a data storage device at step 318, and the routine is terminated at step 320.

It should be noted that the various steps illustrated by the routine 300 are not limiting and can be altered, rearranged or omitted as desired. Additional processing can be included in which aligning plates are formed on the slider in order to provide aligning parameters to the first and second side surfaces of the slider, concurrently.

As can be appreciated by one skilled in the art, the various embodiments illustrated herein can provide an HGA configuration with beneficial operational characteristics and reduced manufacturing process variations. The various processing steps applied to place the inverted dimple onto the slider reduce the amounts of variations in slider/dimple placement to the range of mask misregistration errors, which are substantially smaller than conventional mechanical assembly tolerances. This can provide significant reductions in pitch and roll offset errors.

The location of the dimple onto the slider also facilitates pre-assembly manufacturing using processes with small tolerances that result in precisely aligned dimple and slider relationships. The use of alignment features can further ensure proper dimple location. It will be appreciated that the various embodiments discussed herein have numerous potential applications and are not limited to a certain field of electronic media or type of data storage devices.

For the purposes of the present disclosure, the term "balanced" will be construed as an equilibrium of forces with respect to both the slider and the dimple. For example, a misalignment of the dimple and slider can result in roll and pitch offset that is not balanced due to the absence of equal forces and the resultant angular deflection of the slider in relation to the dimple, as shown in FIGS. 3A and 3B. With a balanced slider about the dimple, no lateral or rotational net forces are present on either the slider or the dimple. Reference to a dimple being disposed on or attached to a slider will be understood as attachment of the dimple directly to the slider, with or It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a slider with opposing first and second side surfaces, an air bearing feature on said first side surface and a dimple extending from a support ring with a hemispherical shape from said second side surface and adapted to facilitate multi-axial rotation of the slider, the support ring configured to align the dimple on the slider.

2. The apparatus of claim 1, wherein the dimple is in contacting engagement with the second side surface of the slider.

3. The apparatus of claim 1, wherein the dimple is integrally formed on the second side surface of the slider by removing material from said slider to concurrently form said slider and said second side surface.

4. The apparatus of claim 1, wherein the slider is formed of a first material and the dimple is formed of a second material molded onto the slider.

5. The apparatus of claim 1, wherein a gimbal is secured to the second side surface and provides preload forces to the dimple.

6. The apparatus of claim 5, wherein the gimbal has an aperture through which the dimple extends in non-contacting relation to said gimbal.

7. The apparatus of claim 1, wherein a flex circuit is attached to the second side surface to provide an electrically conductive path for a data transducing element mounted to said slider.

8. The apparatus of claim 1, wherein the slider is affixed to a gimbal comprising a substantially rectilinear gimbal plate one end of which is affixed to a load beam using an alignment block disposed between said one end and said load beam.

9. The apparatus of claim 1, wherein the second side surface of the slider has a first alignment feature, the dimple is separately formed on a support ring having a second alignment feature, and the dimple is attached to the slider by interconnection of the first alignment feature with the second alignment feature.

10. The apparatus of claim 1, further comprising a stepped load beam with a lowered portion against which the dimple contactingly engages and a raised portion adjacent the lowered portion to which a gimbal plate secured to the slider is attached.

11. A method comprising:
    forming a slider with an air bearing feature on a first side surface;
    forming the dimple; and
    disposing the formed dimple on a second side surface opposite the first side surface, the dimple extending from and attached to said second side surface to facilitate multi-axial rotation of the slider.

12. The met hod of claim 11, wherein the forming a slider step comprises providing a first alignment feature on said first side surface, and wherein the disposing step comprises forming the dimple on a first side of a support member and a second alignment feature on an opposing second side of the support member, and contactingly aligning the second align ent feature with the first alignment feature.

13. The method of claim 11, wherein the dimple is integrally formed on the second side surface of the slider by removing material from said slider to concurrently form said slider and said second side surface, the dimple and the slider having a single piece construction of a common material.

14. The method of claim 11, wherein the slider is formed of a first material and the dimple is formed of a second material that is injection molded onto the slider.

15. The method of claim 11, further comprising attaching the slider to a gimbal having an aperture through which the dimple extends in non-contacting relation to said gimbal, and attaching the gimbal to a load arm so that a curvilinear surface of the dimple contactingly engages said load arm.

16. The apparatus of claim 11, wherein the slider is balanced about the dimple without any roll offset and pitch offset.

17. A method comprising:
    providing a slider with an air bearing feature on a first side surface and an first alignment feature on a second side surface;
    forming a dimple with a linear surface to which a second alignment ure is mounted;
    interconnecting the second alignment feature with the first alignment feature to secure the dimple at a predetermined location on the slider; and
    housing the dimple within an aperture of a gimbal so that the dimple extends beyond the gimbal to engage a load beam.

18. The method of claim 17, wherein the load beam has a stepped region that engages the dimple to reduce a roll center height.

19. The method of claim 17, wherein the forming step comprises forming the dimple on a first side of a support member and the second alignment feature on an opposing second side of the support member.

20. The apparatus of claim 11, wherein the dimple extends from the slider with a continuously curvilinear surface.

\* \* \* \* \*